C. GALLAGHER.
Car-Coupling.

No. 134,199.                                   Patented Dec. 24, 1872.

Witnesses:
John Becker
C. Sedgwick

Inventor:
C. Gallagher
per Munn & Co.
Attorneys.

UNITED STATES PATENT OFFICE.

CHARLES GALLAGHER, OF TAUNTON, MASSACHUSETTS.

IMPROVEMENT IN CAR-COUPLINGS.

Specification forming part of Letters Patent No. 134,199, dated December 24, 1872.

*To all whom it may concern:*

Figure 1:
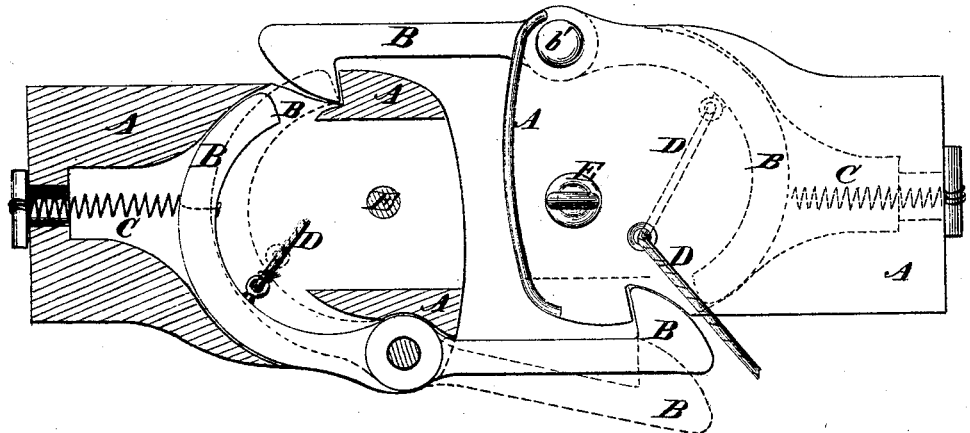
Figure 2:
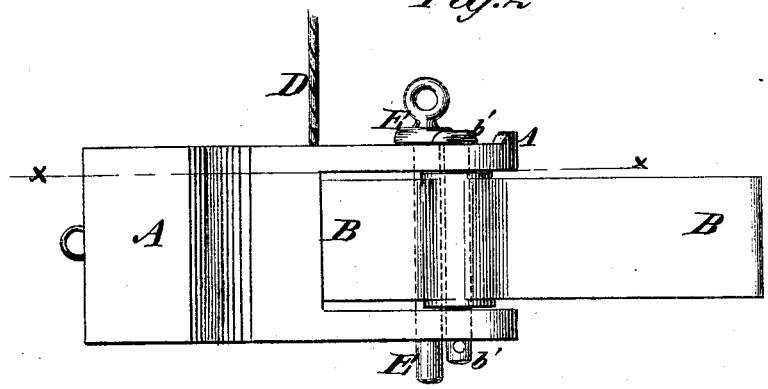

Be it known that I, CHARLES GALLAGHER, of Taunton, in the county of Bristol and State of Massachusetts, have invented a new and useful Improvement in Car-Coupling, of which the following is a specification:

Figure 1 is a top view of my improved car-coupling, partly in horizontal section, through the line $x\ x$, Fig. 2. Fig. 2 is a side view of one part of the coupling.

Similar letters of reference indicate corresponding parts.

My invention has for its object to furnish an improved car-coupling, simple in construction, convenient in use, and reliable in operation, and which shall be so constructed as to couple the cars automatically as they are run together, and which may be uncoupled from the platform, top, or side of the cars; and it consists in the hooks, made with curved inner ends provided with coiled springs and cords or chains, and arranged to operate in connection with the recessed bumper-heads, as hereinafter more fully described.

A are the bumper-heads or bunters, in one side of each of which is formed a recess in which is pivoted a hook, B, by means of a pin or bolt, $b'$. The outer or projecting end of the hook B is inclined or rounded off, and has a shoulder formed upon its inner side, as shown in Fig. 1, to catch or hook upon a projection or into a notch formed upon or in the side of the bumper-head of the adjacent car. The inner part of the hook B is curved into a semicircular form and passes through a recess or cavity in the bumper-head, and extends so far that its end may be close to the inclined end of the hook of the other car, as shown in Fig. 1. The hook B is held in working position by a coiled spring, C, one end of which is secured to the curved part of the hook B, and its other end is secured to the inner end of the bumper.

By this construction, when the cars are run together each hook B is pushed outward by its inclined end striking against the opposite bumper-head, so that the said hook may catch upon its projection or into its notch, the coiled spring C holding it in place.

The hooks B are drawn out to uncouple the cars by the cords or chains D, the ends of which are attached to the curved part of the hooks B. The cords or chains D pass up through holes in the top of the bumper-heads A in such positions that when the said ropes or chains are drawn upon, the curved parts of the hooks will be drawn in such a direction that the curved end of each hook will press against the inclined end of the other hook and force its shoulder out of its notch, uncoupling the cars.

By this construction, by pulling upon either rope or chain D both hooks B will be pulled outward at the same time. The outer ends of the cords or chains D may be connected with the platform or top of the car, or secured in any other place whence it is desired to operate them; or they may be connected with and operated by a lever arranged to be operated from any desired place.

In the forward ends of the bumpers A are formed recesses or cavities somewhat similar to the cavities of an ordinary bumper-head, and which are provided with coupling-pins E to adapt the coupling to receive an ordinary coupling link, when required.

Having thus described my invention, I claim as new and desire to secure by Letters Patent—

The hooks B, made with curved inner ends provided with coiled springs C and cords or chains D, and arranged to operate in connection with the recessed bumper-heads A, substantially as herein shown and described.

CHARLES GALLAGHER.

Witnesses:
EDWARD J. HANNIGAN,
CONNOR BRADY.